(12) United States Patent
Bushee (10) Patent No.: US 7,908,260 B1
(45) Date of Patent: Mar. 15, 2011

(54) SOURCE EDITING, INTERNATIONALIZATION, ADVANCED CONFIGURATION WIZARD, AND SUMMARY PAGE SELECTION FOR INFORMATION AUTOMATION SYSTEMS

(75) Inventor: William J. Bushee, Sioux Falls, SD (US)

(73) Assignee: BrightPlanet Corporation II, Inc., Sioux Falls, SD (US)

( * ) Notice: Subject to any disclaimer, the term of this patent is extended or adjusted under 35 U.S.C. 154(b) by 291 days.

(21) Appl. No.: 12/006,241

(22) Filed: Dec. 31, 2007

Related U.S. Application Data (60) Provisional application No. 60/878,202, filed on Dec. 29, 2006.

(51) Int. Cl.
*G06F 7/00* (2006.01)
*G06F 17/30* (2006.01)

(52) U.S. Cl. ............... 707/705; 707/804; 704/9

(58) Field of Classification Search .......... 707/1–10, 707/100–104.1, 200–206, 600–831; 709/217, 709/219; 704/7, 9
See application file for complete search history.

(56) References Cited

U.S. PATENT DOCUMENTS

| | | | |
|---|---|---|---|
| 5,257,185 A | 10/1993 | Farley et al. |
| 5,321,833 A | 6/1994 | Chang et al. |
| 5,338,976 A | 8/1994 | Anwyl et al. |
| 5,446,891 A | 8/1995 | Kaplan et al. |
| 5,721,902 A | 2/1998 | Schultz |
| 5,761,497 A | 6/1998 | Holt et al. |
| 5,778,363 A | 7/1998 | Light |
| 5,822,731 A | 10/1998 | Schultz |
| 5,826,031 A | 10/1998 | Nielsen |
| 5,835,905 A | 11/1998 | Pirolli et al. |
| 5,845,278 A | 12/1998 | Kirsch et al. |
| 5,873,076 A | 2/1999 | Barr et al. |
| 5,940,834 A | 8/1999 | Pinard et al. |
| 5,983,216 A | 11/1999 | Kirsch et al. |
| 6,006,221 A | 12/1999 | Liddy et al. |
| 6,012,053 A | 1/2000 | Pant et al. |
| 6,018,733 A | 1/2000 | Kirsch et al. |

(Continued)

FOREIGN PATENT DOCUMENTS

JP   11224256   8/1999

(Continued)

OTHER PUBLICATIONS

Ntoulas et al., Downloading textual hidden web content through keyword queries, 2005, IEEE, 100-109.*

(Continued)

*Primary Examiner* — Jean B Fleurantin
(74) *Attorney, Agent, or Firm* — Patterson Thuente Christensen Pedersen P.A.

(57) ABSTRACT

A source manager includes an editor program that can be used to edit an existing source record via a graphical user interface (GUI). Test Action and Test Source functions allow a user to test enter a query and to test a source expeditiously. A conversion tool converts existing sources to the design and format to reconcile data scattered among the source engine data and source partition record. For handling internationalization issues, aspects of the invention include persistently storing the source's encoding type during the configuration process, and then using that encoding type later during the deep harvest phase. According to another aspect of the invention a solution for selecting a summary passage for a particular source is provided. Other aspects of the invention include solutions for character encoding, "Next Links" recognition and "Next Results" handling.

20 Claims, 9 Drawing Sheets

U.S. PATENT DOCUMENTS

| | | | |
|---|---|---|---|
| 6,057,842 A | 5/2000 | Knowlton et al. | |
| 6,067,539 A | 5/2000 | Cohen | |
| 6,078,914 A | 6/2000 | Redfern | |
| 6,112,202 A | 8/2000 | Kleinberg | |
| 6,167,393 A | 12/2000 | Davis et al. | |
| 6,175,830 B1 | 1/2001 | Maynard | |
| 6,182,065 B1 | 1/2001 | Yeomans | |
| 6,199,061 B1 | 3/2001 | Blewett et al. | |
| 6,237,011 B1 | 5/2001 | Ferguson et al. | |
| 6,247,010 B1 * | 6/2001 | Doi et al. | 707/3 |
| 6,247,029 B1 | 6/2001 | Kelley et al. | |
| 6,253,208 B1 | 6/2001 | Wittgreffe et al. | |
| 6,278,993 B1 | 8/2001 | Kumar et al. | |
| 6,282,537 B1 | 8/2001 | Madnick et al. | |
| 6,321,228 B1 | 11/2001 | Crandall | |
| 6,418,433 B1 | 7/2002 | Chakrabarti et al. | |
| 6,418,440 B1 | 7/2002 | Kuo et al. | |
| 6,424,980 B1 | 7/2002 | Iizuka et al. | |
| 6,457,004 B1 | 9/2002 | Nishioka et al. | |
| 6,463,430 B1 | 10/2002 | Brady et al. | |
| 6,480,837 B1 | 11/2002 | Dutta | |
| 6,510,427 B1 | 1/2003 | Bossemeyer et al. | |
| 6,526,479 B2 | 2/2003 | Rosenzweig | |
| 6,549,941 B1 | 4/2003 | Jaquith et al. | |
| 6,553,364 B1 | 4/2003 | Wu | |
| 6,564,210 B1 | 5/2003 | Korda et al. | |
| 6,584,460 B1 | 6/2003 | Iwayama et al. | |
| 6,654,734 B1 | 11/2003 | Mani et al. | |
| 6,654,749 B1 | 11/2003 | Nashed | |
| 6,665,666 B1 | 12/2003 | Brown et al. | |
| 6,704,729 B1 | 3/2004 | Klein et al. | |
| 6,711,569 B1 | 3/2004 | Bushee | |
| 6,718,365 B1 | 4/2004 | Dutta | |
| 6,745,161 B1 | 6/2004 | Arnold et al. | |
| 6,751,600 B1 | 6/2004 | Wolin | |
| 6,757,866 B1 | 6/2004 | Dey et al. | |
| 6,782,380 B1 | 8/2004 | Thede | |
| 6,782,387 B1 | 8/2004 | Kumashio | |
| 6,804,677 B2 | 10/2004 | Shadmon et al. | |
| 6,816,175 B1 | 11/2004 | Hamp et al. | |
| 6,920,448 B2 | 7/2005 | Kincaid et al. | |
| 6,922,699 B2 | 7/2005 | Schuetze et al. | |
| 6,968,338 B1 | 11/2005 | Gawdiak et al. | |
| 7,016,910 B2 | 3/2006 | Egilsson et al. | |
| 7,043,487 B2 | 5/2006 | Krishnamurthy et al. | |
| 7,146,409 B1 * | 12/2006 | Bushee et al. | 709/219 |
| 7,181,438 B1 | 2/2007 | Szabo | |
| 7,240,045 B1 * | 7/2007 | Bushee | 707/3 |
| 7,249,122 B1 * | 7/2007 | Bushee et al. | 707/3 |
| 7,581,170 B2 * | 8/2009 | Baumgartner et al. | 715/234 |
| 2001/0037324 A1 | 11/2001 | Agrawal et al. | |
| 2001/0051958 A1 | 12/2001 | deVries et al. | |
| 2001/0056414 A1 | 12/2001 | Christal et al. | |
| 2002/0007374 A1 | 1/2002 | Marks et al. | |
| 2002/0078090 A1 | 6/2002 | Hwang et al. | |
| 2002/0099723 A1 | 7/2002 | Garcia-Chiesa | |
| 2002/0120598 A1 | 8/2002 | Shadmon et al. | |
| 2003/0009439 A1 | 1/2003 | Lee | |
| 2003/0078766 A1 | 4/2003 | Appelt et al. | |
| 2003/0145022 A1 | 7/2003 | Dingley | |
| 2003/0177111 A1 | 9/2003 | Egendorf et al. | |
| 2003/0225757 A1 | 12/2003 | Evans et al. | |
| 2004/0172601 A1 | 9/2004 | Rettig et al. | |
| 2004/0230566 A1 | 11/2004 | Balijepalli et al. | |
| 2004/0230571 A1 | 11/2004 | Robertson | |
| 2005/0010556 A1 | 1/2005 | Phelan | |
| 2005/0055355 A1 | 3/2005 | Murthy et al. | |
| 2005/0228786 A1 | 10/2005 | Murthy et al. | |
| 2006/0053091 A1 | 3/2006 | Dumitru et al. | |
| 2006/0059184 A1 | 3/2006 | Narsude | |
| 2006/0224579 A1 * | 10/2006 | Zheng | 707/5 |
| 2006/0277168 A1 | 12/2006 | Hammond et al. | |
| 2009/0024613 A1 | 1/2009 | Niu et al. | |
| 2010/0174706 A1 | 7/2010 | Bushee et al. | |

FOREIGN PATENT DOCUMENTS

| | | |
|---|---|---|
| JP | 11224292 | 8/1999 |
| WO | WO 9204681 | 3/1992 |
| WO | WO 9712333 | 4/1997 |

OTHER PUBLICATIONS

Sunayama et al., Search interface for query restructuring with discovering user interest, Aug. 6, 2002, IEEE, 538-541.*

Fielding et al., Network Working Group. Standard Track. Jan. 1997, All Pages.

Elliotte Rusty Harold, JAVA Network Programming, Second Edition, 2000, All Pages.

Powell et al., "Multilingual Federated Searching Across Heterogeneous Collections", D-Lib Magazine. ISSN 1082-9873 Sep. 1998. pp. 1-11.

Kikui et al., "Cross-lingual Information Retrieval on the WWW", Multilinguality in Software Engineering: AI Contribution (in conjunction with ECAI 96).1996. pp. 1-6.

Hull, "Using Structured Queries for Disambiguation in Cross-Language Information Retrieval", Rank Xerox Research Centre. Jun. 23, 1997. 11 pages.

Cheng et al, "Translating Unknown Queries with Web Corpora for Cross-Language Information Retrieval", Institute of Information Science, Academia Sinica, Taiwan 2004. 8 pages.

Lu et al, "Towards Web Mining of Query Translations for Cross-Language Information Retrieval in Digital Libraries", Institute of Infomration Science, Academia Sinica. 12 pages, Dec. 31, 2007.

Hu et al., "Improving Query Translation for Cross-Language Infomation Retrieval using a Web-based Approach", 2004. 8 pages.

Wang, "Matching Meaning for Cross-Language Information Retrieval" Dissertation Directed by: Professor Douglas W. Oard. 2005 (Abstract), Dec. 31, 2007.

Cheng et al., "XML and DB2". IBM Santa Teresa laboratory. 5 pages, Dec. 31, 2007.

Banerjee et al., "Oracle8i—The XML *Enabled* data Management System", Oracle Corporation. 8 pages. Dec. 31, 2007.

Hawking, "Web Search Engines: Part 2", How Things Work, Jun. 2006, pp. 86-88.

Application and File History of U.S. Patent No. 6,711,569 issued Mar. 23, 2004, Inventors Bushee et al., at www.uspto.gov.

Application and File History of U.S. Appl. No. 10/777,711, filed Feb. 12, 2004, Inventors Bushee et al., at www.uspto.gov.

Application and File History of U.S. Patent No. 7,249,122, issued Jul. 24, 2007, inventors Bushee et al., at www.uspto.gov.

Application and File History of U.S. Patent No. 7,146,409, issued Dec. 5, 2006, Inventors Bushee et al., at www.uspto.gov.

Application and File History of U.S. Patent No. 7,676,555, issued Mar. 9, 2010, Inventors Bushee et al., at www.uspto.gov.

Application and File History of U.S. Publication No. 2010/0174706, published Jul. 8, 2010, Inventors Bushee et al., at www.uspto.gov.

Application and File History of U.S. Appl. No. 09/911,433, filed Jul. 24, 2001, Inventor Tiahrt, at www.uspto.gov.

Application and File History of U.S. Patent No. 7,240,045, filed Jul. 3, 2007, Inventors Bushee et al., at www.uspto.gov.

Application and File History of U.S. Appl. No. 12/012,612, filed Feb. 4, 2008, Inventors Bushee et al., at www.uspto.gov.

Olsen, Spying An Intelligent Search Engine. www.news.com dated Aug. 21, 2006. Copyright 1995-2006 CNET Networks, Inc. All Pages.

Technology White Paper, Semetric®: Conceptual Search and Discovery. NIUM. Engenium Corporation. All Pages. Dec. 31, 2007.

Shadbolt et al., "The Semantic Web Revisited" IEEE Intelligent Systems. May/Jun. 2006. pp. 96-101.

Fan et al., "Tapping the Power of Text Mining", Communications of the ACM. Sep. 2006. vol. 49. No. 9. pp. 77-82.

McRae-Spencer, et al., "Semiometrics: Applying Ontogoloes across Large-Scale Digital Libraries", School of Electronics and Comuter Science. Highfield, Southhampton. All Pages. Dec. 31, 2007.

* cited by examiner

Fig. 1

SOURCE EDITOR

WARNING
Many of these settings require advanced knowledge about how browsers and servers intercommunicate. You should not make changes to these settings unless you fully understand them or the source may stop working. This topic explains only the available settings for refining source communications and not the technical theory or design behind their operation. However, the STATUS, SOURCE NAME, and NOTES entries may be changed as desired with no effect on source communications.

[ Save Source ]  [ Cancel ]  [ Test a Source Harvest ]

GENERAL INFORMATION
Source ID: 1|evolve24|sources    Status: [In Progress ▼]
Source Name: [Google]
URL: [http://google.com]    [View Search Page]
Note: Do not attempt to change URL or source may not work.

SOURCE ACTION
SRR Filter: ☑    Encoding: [US-ASCII]    Action Method: ⊙ Get  ○ Post
Action String:
[http://www.google.com/search?hl=en&q=%QUERY_STRING%&btnG=Google+Search]

Enter Query for Source Action Test:    Query Type: [All of the words ▼]    [Test Source Action]

BOOLEAN SUPPORT
☑ AND  [AND]    Phrase ☑
☑ OR   [OR]     Parens ☐

QUERY NORMALIZATION TEST
Test Query:    Query Type: [All of these words ▼]   Language: [Standard ▼]   [Normalize]

URL IDENTIFICATION
Next Link Url:                          Next Link Test:
                                        2
                                        3
                                        4
                                        5
                                        6
                                        7
                                        8

Filter Url:                             Filter Test:
http://www.google.com/webhp             more sponsored links >
http://images.google.com/images         cached
http://video.google.com/videosearch     searchwithinresults
http://news.google.com/news             language tools
http://maps.google.com/maps             dissatisfied? help us improve
http://www.google.com/intl/en/options
http://www.google.com/search

NOTES:
-- Test Stats --
10 Results identified
50 Filters processed
10 Next Pages found
Queries: {body personalized sign video}
Boolean Queries:
body AND aids
body OR aids
body AND bodyyaids

Fig. 2

Fig. 3A
Query Based Summarization

Preparation
1. Convert each query term to either one of a term ordinal or a term ordinal set. The latter are required for wild cards or regular expressions, since either may participate just as if it were a single term.
2. Read and use canonical Huffman codes to decompress the document. The document is stored in integer form, so after decompression it is an integer form, where term ordinals occupy the relative positions of the terms in the original document.
3. Allocate a zeroed buffer to record quintuples, where each term has:
    a. <Original doc position, term score, cumulative slot score, count of window's slots covered, flag for this slot's cover mark>
    b. where each 'slot' corresponds to exactly one term in the document.

Fig. 3B

Scoring and Ranking
4. Term's slot score:
    a. Traverse document computing a score for each term's slot.
    b. Scores are buffered awaiting the window score computation (see below)
    c. Non-boosted, Non-query term slots are assigned a score of 0.
    d. Any query term ordinal, from a single term or term set, boosts a score.
        i. Boosting uses doubling, (a geometric progression) to raise the score.
        ii. The boost is based on proximity to other query term ordinals.
        iii. In a consecutive query term sequence:
            1. Each term is twice the score of its predecessor
                a. First term slot receives a score of 1 (floor, $2^0$)
                b. Second term score: $2(2^1)$
                c. Third term ordinal slot score: $4 (2^2)$
                d. Nth term ordinal slot score: $2^{(N-1)}$
            2. Score ceiling is 1, 073, 741, 824 ($2^{30}$)
        iv. Non-query term slot scores are halved (symmetric reduction)
            1. (N + 1st) is Nth score divided by 2
            2. (N + 2nd) is (N + 1st) divided by 2
            3. Score floor is 1.

5. Window scores:
    a. traverse score buffer
        i. computing a window-sized cumulative score
        ii. move window one slot forward
        iii. skip over zero scores (non-boosted, non-query term slots)
        iv. place window's score in the quintuple buffer
6. Sort windows in descending order by cumulative score (computed above in 5)

Fig. 3C

Marking
7. Mark highest-scoring window's slot coverage
   a. Center query terms in window
      i. Count zeroes preceding first query term
      ii. Count zeroes after last query term
      iii. Center begins at (original start) + (frontZeroes / 2) - ((backZeroes +1) / 2);
      iv. Tie bias is to move query terms slightly toward window end.
   b. Mark each slot in centered window as covered
   c. Record the new values: window start
      i. Window start
      ii. Count of slots covered
8. For all subsequent windows
   a. Move window's front forward past any marked slots
   b. Contract window's end before any marked slots
   c. Center query terms in window (7.a above)
   d. If overlap reduces window to less then 1/2 window size
      i. Coalesce with adjacent window
      ii. Mark added slot coverage in adjacent widow
   e. Recompute window's score based on adjusted location

Fig. 3D

Ordering
9. Resort windows (except highest scoring) based on new scores
10. Eliminate any windows beyond total window count threshold
11. Resort windows by document location

Fig. 3E

Finalize summary buffer
12. Retrieve each term ordinal's string within a window
    a. Place a bold tag around query terms
    b. Examine phrases terms using phrase apparatus
       i. Phrase terms are checked against phrase itself to determine bold marking
       ii. Phrase terms that are not in phrases are not bolded
13. Concatenate strings together
    a. Honor buffer size restriction by truncation windows or window portions.

Fig. 4A

ORIGINAL

Fig. 4B

REVISED

Fig. 5A

```
// AC_NextLink.txt
//
// A list of text labels that indicate a link to take you to the next
// set of search results.
```

| | | |
|---|---|---|
| // English Tokens | next 10 results 51-60 | 2 |
| next | > > | 3 |
| next page | next 10 results 61-70 | 4 |
| [next] | > > | 5 |
| [next page] | next 10 results 71-80 | 6 |
| next results | > > | 7 |
| next   | next 10 results 81-90 | 8 |
| next   > > | > > | 9 |
| next > | next 10 results 91-100 | 10 |
| next> > | > > | 11 |
| next > | (next 20 results) | 12 |
| next hits | (next 10 results) | 13 |
| next list | (next 9 results) | 14 |
|  next>> | (next 8 results) | 15 |
| >> | (next 7 results) | 16 |
| >> | (next 6 results) | 17 |
| > | (next 5 results) | 18 |
| > | (next 4 results) | 19 |
|   ...>>> | (next 3 results) | 20 |
| more results | (next 2 results) | 25 |
| next 5 | (next 1 results) | 30 |
| next 5 documents | [ + 25 >>] | 35 |
| next 10 | page down | 40 |
| next 10 results | arrow | 45 |
| next 10 records | click here for more | 50 |
| next 10 pages > | get the next | 55 |
| next 15 | go to | 60 |
| next 20 | more | 70 |
| next 30 matches | site matches | 80 |
| next 50 | more in this category | 90 |
| next 50 > > | search for more | 100 |
| next 100 | search for next | |
| display next | show all | |
| get more search results | show more results matching | |
| more results | 1-10 | |
| next 10 results 11-20 | 11-20 | |
| > > | 21-30 | |
| next 10 results | 31-40 | |
| > > | 41-50 | |
| next 10 results 31-40 | 51-60 | |
| > > | 61-70 | |
| next 10 results 41-50 | 71-80 | |
| > > | 81-90 | |
| | 91-100 | |

*Fig. 5B*

```
// Chinese Traditional        其次10 个结果           点击这里为更多
其次                          其次10 页              得到下
下页                          其次15                去
[下]                          其次20                站点比赛
[下页]                        其次30 次比赛          更寻找更多
下个结果                      其次50                寻找其次
更多结果                      其次100               显示所有
其次5                         显示其次               显示更多结果匹配
其次5 个文件                  取得更多查寻结果
其次10                        更多结果

// Chinese Simplified         其次10 個結果           點擊這裡為更多
其次                          其次10 頁              得到下
下頁                          其次15                去
[下]                          其次20                站點比賽
[下頁]                        其次30 次比賽          更尋找更多
下個結果                      其次50                尋找其次
更多結果                      其次100               顯示所有
其次5                         顯示其次               顯示更多結果匹配
其次5 個文件                  取得更多查尋結果
其次10                        更多結果 apres 10 pages         allez
// French                     apres 15               davantage
apres                         apres 20               des allumettes
prochaine page                apres 30 allumettes    d ' emplacement
[prochain]                    apres 50               recherchent plus
[prochain page]               apres 100              recherchez apres
les prochains resultats       affichage apres        montrent tous
plus de resultats             obtenez plus de        montrez plus de
apres 5                       resultats de recherche resultata s ' assortissant
apres 5 documents             plus de resultats      vorwarts
apres 10                      clic ici pour plus
apres 10 resultats            obtiennent le prochain
```

Fig. 5C

```
// German
zunachst
folgende seite
[folgend]
[folgende seite]
folgende resultate
mehr resultate
zunachst 5
zunachst 5 dokumente
zunächst 10
zunachst 10 resultate
zunachst 10 seiten
```
zunachst 15
zunachst 20
zunachst 30 gleiche
zunachst 50
zunachst 100
anzeige zunachst
erhalten sie mehr
suchresultate
mehr resultate
clicken sie hier fur mehr
erhalten das folgende gehen sie
mehr
aufstellungsortgleiche
suchen nach mehr
sunchen sie nach zunachst
zeigen alle
zeigen sie mehr
zusammenpassende resultate
weiter

```
// Italian
dopo
pagina seguente
[seguente]
[pagina seguente]
i risultati seguente
piu risultati
dopo 5
dopo 5 documenti
dopo 10
dopo 10 risultati
dopo 10 pagine
```
dopo 15
dopo 20
dopo 30 fiammiferi
dopo 50
dopo 100
esposizione dopo
ottenga piu risultati di ricerca
piu risultati
scattisi qui per piu
ottengono il seguente
vada
di piu fiammiferi del luogo
cercano piu
cerchi dopo
mostrano tutti
mostri piu risultati che corrispondono
successiva >>>
successivi >>
successiva
sta
sta

```
// Japanese
次に
次のページ
[次]
[次のページ]
次の結果
より多くの結果多くを
は次に15
次に5 つ
次に5 通の文書
次に10
```
次に10 の結果
次に10 ページ次に20
次に30 のマッチ
次に50
次に100
次の表示
より多くの調査の結果を得なさい
より多くの結果
多くのためにここにかちりと鳴らしなさい

// Korean
다음의 다음
다음 페이지
[다음]
[다음 페이지]
다음 결과
결과 더 더를 위해
은 다음 5개의
다음 5개의 문서
다음 10의

다음 10의 결과
다음 10 페이지 다음20
다음30성냥
다음50
다음 다음15
100
전시
수색 결과를 더 얻으십시오
결과 더
더를 위해 여기 누르십시오

다음을
가십시요
좀더
위치 성냥
찾는다
다음을 위해 찾으십시오
보인다 모두를 얻는다
어울리는 결과를 더 보이십시오

// Spanish
despues
siguiente
pagina siguiente
[siguiente]
[pagina siguiente]
los resultados
siguientes
mas resultados
despues 5
despues 5 document despues 10
despues 10 resultados
despues 10 paginas
despues 15
despues 20
despues 30 fosforos
despues 50
despues 100
exhibicion despues
consiga mas resultados
de la busqueda mas resultados
chasque aqui para mas
consiguen el siguiente
vaya
los fosforos del sitio
buscan mas para mas
busque para despues
demuestran todos
demuestre mas resultados
que emparejan // Indonesia
berikut 10 dokumen
berikut
dokumen

SOURCE EDITING, INTERNATIONALIZATION, ADVANCED CONFIGURATION WIZARD, AND SUMMARY PAGE SELECTION FOR INFORMATION AUTOMATION SYSTEMS

CLAIM TO PRIORITY

This Application claims the benefit of U.S. Provisional Application No. 60/878,202, filed Dec. 29, 2006, and entitled "SOURCE EDITING, INTERNATIONALIZATION, ADVANCED CONFIGURATION WIZARD, AND SUMMARY PAGE SELECTION FOR INFORMATION AUTOMATION SYSTEMS," which is incorporated by reference herein in its entirety.

REFERENCE TO A COMPUTER PROGRAM LISTING APPENDIX

Reference is made to a computer program listing appendix submitted on compact disc herewith in duplicate. The computer program listing appendix consists of the following files, and is incorporated by reference herein in its entirety.

| Title | Size in Bytes | Creation Date of File Version |
| --- | --- | --- |
| NameValuePair.java | 2,576 | Dec. 28, 2006 |
| QueryNormalizer.java | 7,786 | Dec. 26, 2007 |
| QueryNormalizerChinese.java | 4,080 | Dec. 26, 2007 |
| QueryNormalizerJapanese.java | 4,062 | Dec. 26, 2007 |
| QueryNormalizerStandard.java | 906 | Dec. 26, 2007 |
| sourceConfig.js | 5,734 | Aug. 02, 2007 |
| SourceInterface.java | 26,202 | Dec. 26, 2007 |
| sourceManager.jsp | 37,454 | Dec. 26, 2007 |
| SourceManagerUI.java | 44,095 | Dec. 26, 2007 |
| SourceManagerUIControl.Java | 15,052 | Dec. 26, 2007 |
| SourceManagerUIServlet.Java | 8,013 | Dec. 26, 2007 |
| SourceNormalizer.Java | 7,501 | Dec. 26, 2007 |
| StemSumm.cpp | 107,091 | Dec. 26, 2007 |

FIELD OF THE INVENTION

The invention is directed to data gathering and analysis and, more particularly, to improvements directed to deep harvest and source editing with support for different linguistic structures among various languages, configuration, and summary creation.

BACKGROUND OF THE INVENTION

Information automation systems for gathering and organizing information of interest from large, unstructured, repositories (such as the Internet) are known. One such system issues a query to a search engine (known as a deep Web source), accumulates & downloads the results from that engine's search, applies the query using a scoring system against the results returned, then either accepts and stores the document or rejects and purges the document.

Occasionally, during the configuration process the source record does not get properly created or contains information that needs to be adjusted. This might be as simple as providing a better title for the source or as complicated as adjusting the form's field/value pairs in the action string. An editor that permits users to efficiently make such adjustments is desirable.

Another type of challenge in present-day information automation systems is internationalization, i.e., the ability effectively search sources in various languages. Systems for creating database queries using character sets beyond 7-bit ASCII are known. However, significant challenges exist to deep harvest from non-Latin based language deep Web sources.

One such challenge is to communicate the user's query with a given source using the source's character encoding as well as the source's Boolean support capabilities. Previously, all communication was done using ASCII (ISO-8859) on out-bound traffic. However, nearly all non-Latin based languages use code points beyond ASCII (ISO-8859), so this approach provided invalid data that are simply rejected.

Another challenge involves Boolean searching in foreign languages. Most languages, especially Latin based languages, support whitespace between the query terms and Boolean operators. Some languages, however, such as Chinese, Japanese and Korean, for example, are very specific about where a space can appear when conducting a query. The rules even vary from source to source within the same language. Boolean searching in foreign languages cannot be conducted in the same way it is done in English.

A further challenge in information automation systems concerns systems that operate to retrieve a copy of a source's HTML page, prompt that page to the user, ask the user to interact with the page to conduct a search, and capture what the user does for future use. Previously, the technique was to download the HTML page, scan the HTML for all form elements, and then modify the action strings to point back to query manager. This meant that much of the existing data had to be tucked away in hidden fields on the document then processed later. A solution to improve the efficiency of this operation is desirable.

SUMMARY OF THE INVENTION

One aspect of the invention is directed to a source manager includes an editor program that can be used to edit an existing source record via a graphical user interface (GUI). Various features that facilitate use by human users are included in various embodiments, such as, for example, a tooltip field provides additional information about the content source, popups, and dropdown fields.

Related aspects of the invention include a Test Action function that allows the user to test enter a query and display the source in a new window with the search results using the query, and a Test Source button that allows the user to test a source very quickly after the source has been initially configured or after it has been edited using the source editor.

In another aspect, a conversion tool is provided that converts existing sources to the design and format. This conversion converts and reconciles the data that is scattered among the Source Engine Data (SED), and source partition record into a central storage arrangement.

In yet another aspect, a new arrangement for storing source records is provided. According to this aspect, the source record is stored within the partition (full text search engine) itself. In one example embodiment, the source record utilizes an extensible markup language (XML) form on disk or as a record in a table.

A further aspect of the invention is directed to overcoming the internationalization challenges described above. One embodiment of the invention includes persistently storing the source's encoding type during the configuration process, and then using that encoding type later during the deep harvest phase. Another aspect of the invention implements a way for the end-user to customize the proper way to form complex Boolean queries for each source.

A further aspect of the invention is directed to a system that operates in order to:

retrieve a copy of the source's HTML page;

prompt that page to the user;

ask the user to interact with the page to conduct a search; and capture what the user does for future use.

According to one embodiment, a configuration wizard takes a different approach by not modifying the original HTML forms but instead using JavaScript to adjust the HTML's DOM (Document Object Model) tree to overwrite each form dynamically. This technique has demonstrated significant improvements to configuration success rates.

According to another aspect of the invention a solution for selecting a summary passage for a particular source is provided. Advantageously, performance has been improved over the state of the art by modifying how the each passage is scored relative to the user's Boolean query and how the highest scoring passages are identified.

Other aspects of the invention include solutions for character encoding, "Next Links" recognition and "Next Results" handling.

BRIEF DESCRIPTION OF THE DRAWINGS

The invention may be more completely understood in consideration of the following detailed description of various embodiments of the invention in connection with the accompanying drawings, in which:

FIG. 1 is a screen shot view illustrating a source editor user interface according to one aspect of the invention.

FIGS. 3A-3E are pseudo-code algorithm listings for summary passage selection solution according to embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

In the following Detailed Description section, reference is made to the above-identified Computer Program Listing Appendix, which is incorporated herein by reference in its entirety.

Source Editor

In various embodiments of a source editor according to aspects of the invention, the editor is a stand-alone program, or integrated with a system administration console. Embodiments of the source editor include content editing and moving functionality. In one example embodiment, the following fields are editable:

Title

Encoding and language

Search Results Removal flag

Action string

Action method type

Boolean support for AND, OR, phrase, parentheses, and the like

Next link identification

Filter link identification

In one example embodiment, a tooltip field provides additional information about the source. For example, a user may run the mouse pointer over a source's name and see a tooltip that provides additional information about the contents of a source by way of topics, such as an astronomy source having a tooltip indicating it specializes in planetary science data, or deep space objects (nebula, galaxies, etc.), or the more arcane (black holes, worm holes, string theory, etc.). In a related embodiment, a user may create his or her own tooltips at time of source configuration. This functionality may be of significant value to organizations that want to characterize and share sources.

In another embodiment, the source manager appears as an optional plug in akin to the registry function. In one such embodiment, the source manager is not linked in to the system administration console, and is not generally available to every user by default. For example, the availability of the registry function, and the source manager, would be user-specific.

The popup may have a conventional tabbed design. The first tab can be 'Editor'. In one embodiment, three other potential tabs would be placeholders for the 'Source Analyzer', the 'Language Analyzer' (most of the encoding aspects of the current URLAnalyzer), and the 'Reject Analyzer' (the reject inspection portion of the URLAnalyzer).

In one embodiment, use dropdown lists are employed to enforce data entry integrity. For instance, the language selector may be in the form of a dropdown, which will guide many subsequent lists.

In a related embodiment, a dropdown list, by language, of existing operator variants is present in the 'Boolean' section. Next to the dropdowns is a text entry box for adding a new variant. New variants added in this manner would subsequently appear in the dropdown list of variants for that language. A similar mechanism provides, by language, the Next Text Links. A similar mechanism exists by language for Filter Text.

One aspect of the invention enables users to custom edit their source configurations via a user interface. This aspect recognizes and addresses the need for users to adjust simple issues that may arise during the automatic configuration process.

In one example embodiment, the following fields are editable:

Title

Encoding and language

Search Results Removal flag

Action string

Action method type

Boolean support for AND, OR, phrase, parentheses, and the like

Next link identification

Filter link identification

One embodiment of the source editor implementation, as a Java Server Page (JSP), is in the file entitled sourceManager.jsp, which is incorporated by reference herein in its entirety.

Source Manager

The source manager UI classes are kept separate from the existing source UI class. For illustration, the following class names are utilized:
sourceManagerUI
sourceManagerUIControl
sourceManagerUIServlet In one embodiment, the source manager is invokable from a source editor screen. The user can choose one source from "Current Group" list box and select a button labeled "Edit Source Record". The "Edit Source Record" will then produce the pop-up screen illustrated in FIG. 1 and source code sourceManager.jsp.

In one embodiment, only locally added sources, i.e., those added by a user within the same account, are editable.

The source editor pop-up allows the user to perform the following basic source configuration operations:
  Edit the display name or title of the source. This will be limited to the data currently stored within the system
  Specify or overwrite the source document encoding field
  Specify or overwrite each Boolean operator used by the source
  Expand the "next link" text fields specific to this source
  Expand the "next text" text fields specific to this source
  Expand the "next link" values used by all sources (external list—not distributable)
  Expand the "filter link" text values specified by this source
  Expand the "filter text" text values specified by this source
  Edit the URL and label filters as identified during the configuration process
  Manually adjust the source's Action String
  Edit the sources notes field to record helpful information for later modification
  Adjust the internal source status field
  Add or modify a source authentication value used for scoring Test Action Function In one embodiment, a Test Action button allows the user to test enter in a query in the text box and display the source in a new window with the search results using the query. When the Test Action button is first pressed, the source is automatically saved. This prevents the user from having to save the Source (which closes the window) and then re-open the source editor if the user wants to change some parameters before testing.

If the Source uses the GET method, then the full URL is displayed with the action string containing the query. If the Source uses the POST method, the URL is parsed and the name value pairs are dynamically added as input hidden types on the form. The action string is set to the string before the "?" of the URL. The form is then submitted. Since the action string is changed, it needs to be set back to its original value of "sourceManager" so the proper servlet is used when a different event occurs.

Test Source Button

In one embodiment, a Test Source button allows the user to test a source very quickly after the source has been initially configured or after it has been edited using the source editor. Pressing the 'Test Source' button from various screens takes the user to the DQM's harvest tab and automatically enters this information into the harvest profile:
  Select to conduct a Deep Harvest with this source only
  Enter a default profile name and project assignment
  Uncheck common source use
  Select a default test query, and
  Set the harvest amount to 100 (to ensure multiple results pages are tested).

Users are then presented the query tab so they can manually adjust the query, if necessary. Users can then click the Start Harvest button and wait for the harvest to complete.

The Test Source button is accessible from three locations within DQM:
  At the conclusion of the source configuration—simple or advanced
  On the Manage Sources screen to test an entire group of sources
  On the Source Editor screen to test the currently viewed source One embodiment of the test source operation is in the file entitled sourceManager.jsp, which is incorporated by reference herein in its entirety.

Conversion and Export/Import Tools

In one embodiment, a conversion tool converts existing sources to the design and format. This conversion converts and reconciles the data that is scattered among the Source Engine Data (SED), and source partition record into a central storage arrangement.

In a related embodiment, a source export/import toolkit is available to port sources between accounts or clients. The harvest engine API supports these operations, and UI facilitates user navigation while avoiding collisions.

Additional Application

In one embodiment, a graphical user interface (GUI) application is used to perform source analysis. This GUI application is similar to the conventional EngineConfig test code.

Source Configuration Data

When sources are configured, the following illustrative list of information can be utilized to improve configuration choices:
AS_FindSearch.txt
AC_BadActionString.txt
AC_BadActionUrl.txt
AC_BadLinkText.txt
AC_BannedSites.txt
AC_Filter_Exclude.txt
AC_GoodLinkText.txt
AC_ImmuneActSites.txt
AC_NextLink.txt
AC_Porno.txt In one embodiment, the configuration lists are consolidated into a central location based on language. For example:
<language name="English">
<Boolean>
<and>AND</and>
<or>OR</or>
<not>NOT</not>
<near>NEAR</near>
<after>AFTER</after>
<before>BEFORE</before>
</Boolean>
<encodings>
ISO-8859
windows-1259
UTF-8
</encodings>

```
<nextLinks>
next
next results
more
...
</nextLinks>
<goodSearchLabels>
search
find
locate
query
...
</goodSearchLabels>
<badSearchLabels>
email
help
horoscope
login
login<<
quote
...
</badSearchLabels>
<bannedUrls>
freefind.com
search.freefind.com
...
</bannedUrls>
</language>
```

Storage Arrangement

In another aspect, a new arrangement for storing source records is provided. According to this aspect, the source record is stored within the partition (full text search engine) itself. In one embodiment, the source record utilizes an extensible markup language (XML) form on disk or as a record in a table.

Figure 2:
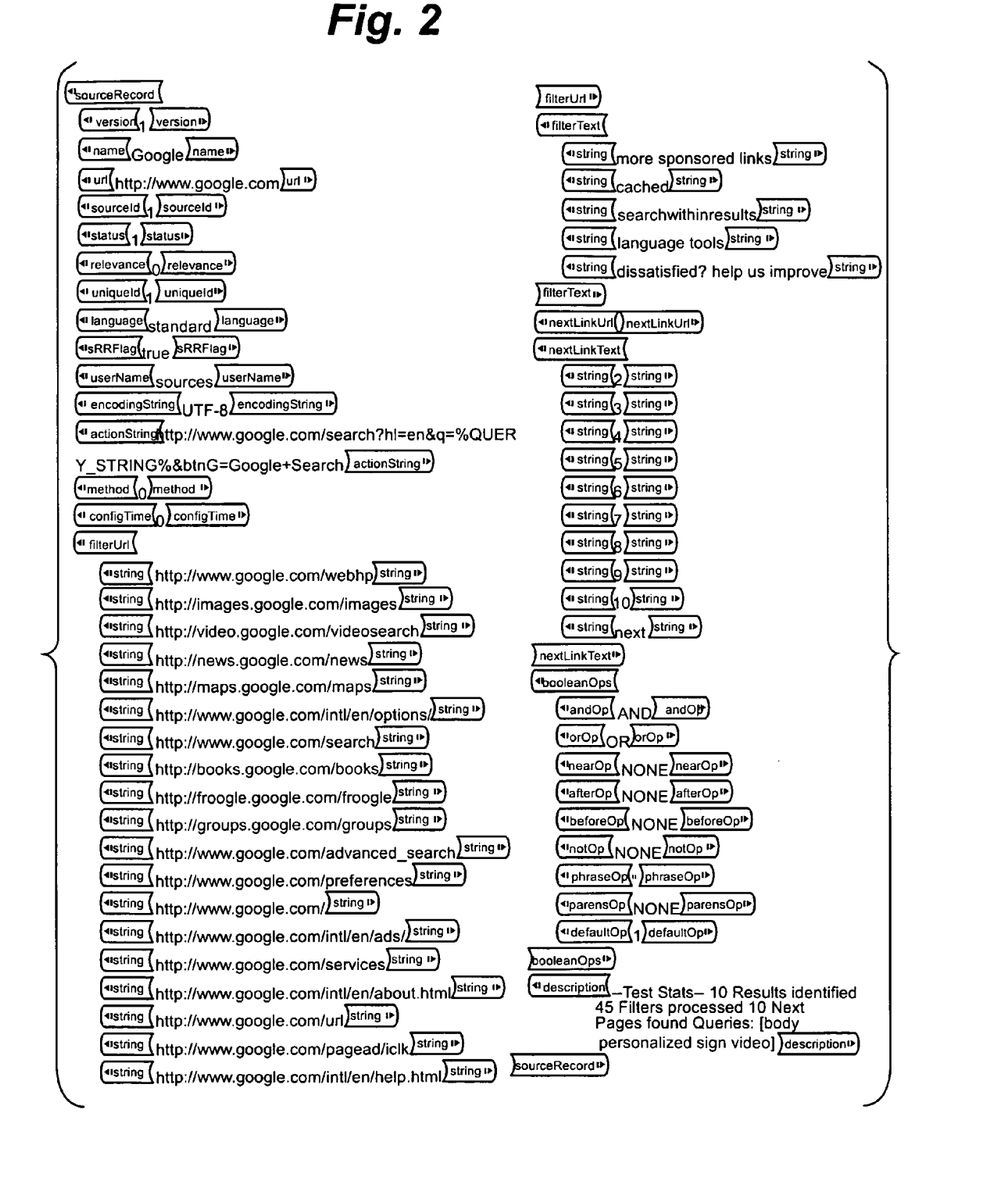
FIG. 2 is a listing of a sample source record in xml format consistent with a storage arrangement in accordance with one aspect of the invention.
Figure 3C:
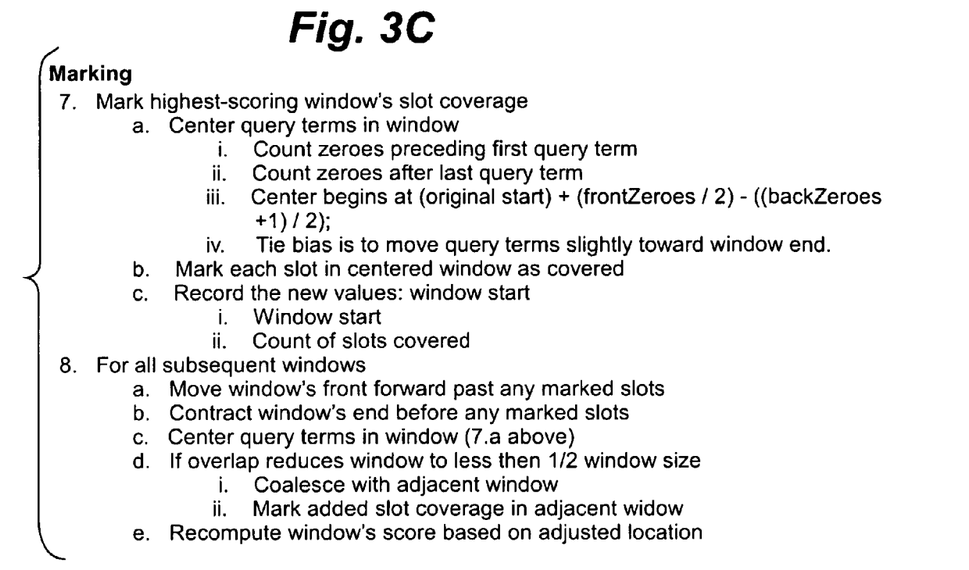
Figure 3D:
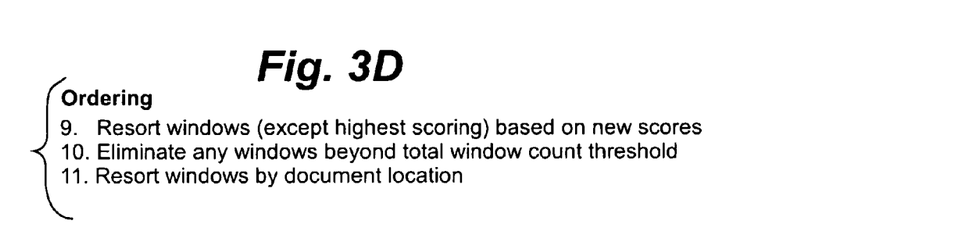
Figure 3E:
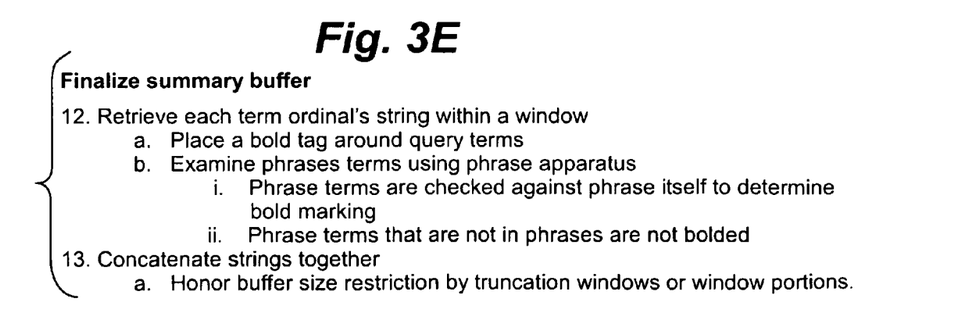

Previously, the source records were stored in their own data storage space that was separate from the partition record. This caused various integration issues. One benefit of this new arrangement is avoiding having to perform an extra lookup step. Another benefit is the additional flexibility provided for distributing the source data. FIG. 2 illustrates a sample XML file entitled "sampleSourceRecord.xml."

Internationalization of DQM

To overcome the internationalization challenges described above, and related challenges, one aspect of the invention is directed to persistently storing the source's encoding type during the configuration process, and then using that encoding type later during the deep harvest phase.

Another aspect of the invention implements a way for the end-user to customize the proper way to form complex Boolean queries for each source. In one embodiment, a customizable query normalization system is provided to support some languages. Table 1 below presents an example embodiment of a query normalization approach for the Chinese language.

TABLE 1

| User Enters | Outbound Query (Chinese) | Outbound Query (English) |
|---|---|---|
| termA AND termB | termAtermB | termA term B |
| "termA termB" | "termAtermB" | "termA termB" |
| termA OR termB | termA termB | termA OR termB |

A major challenge in internationalization and foreign source support is "encoding." This is a complicated area, and will become increasingly more so as more of the known 6,000 human languages globally become available on the Internet.

Encodings specify the arbitrary assignment of numbers to the symbols (characters or ideograms) of the world's written languages needed for electronic transfer and manipulation. One of the first encodings developed in the 1960s was ASCII (numerals, plus a-z; A-Z); others developed over time to deal with other unique characters and the many symbols of (particularly) the Asiatic languages.

Some languages have many character encodings and some encodings, for example Chinese and Japanese, have very complex systems for handling the large number of unique characters. Two different encodings can be incompatible by assigning the same number to two distinct symbols, or vice versa. The Unicode Consortium set out to establish a single character encoding standard for universal encoding that represents all written languages. Unicode is that standard. Within Unicode, there are a three encoding forms, the most common for use in data interchange being UTF-8.

There are tools available to convert nearly any existing character encoding into a UTF-8 encoded string. However, there is also a high prevalence of "legacy" encodings in use on the Internet. The two primary problems when dealing with "legacy" non-Unicode encodings are; 1) identifying the encoding used by a site and converting that encoding to a Unicode string; and 2) communicating with that site in its original encoding.

Previously, users needed to indicate whether a harvest site was in a foreign language. Otherwise, the harvest was treated as standard ASCII. In standard ASCII, no language or encoding detection took place, and all tokenization (which creates an electronic encoded form) used a 7-bit ASCII parser. (Note that ASCII requires few character symbols and those symbols are subsumed by UTF-8.)

Figure 4A:
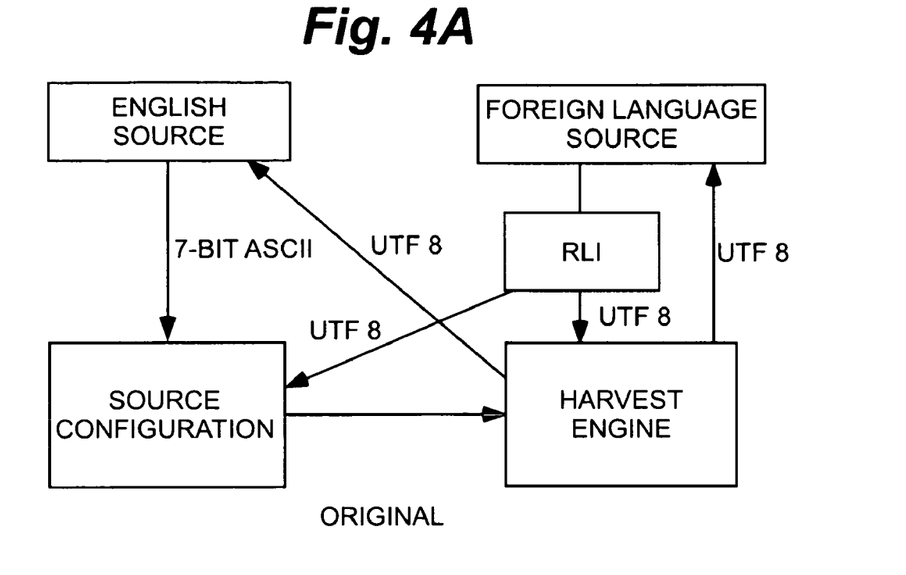
FIGS. 4A and 4B are diagrams illustrating a conventional approach and a "revised" approach according to embodiments of the invention, respectively, of an internationalization technique.
Figure 4B:
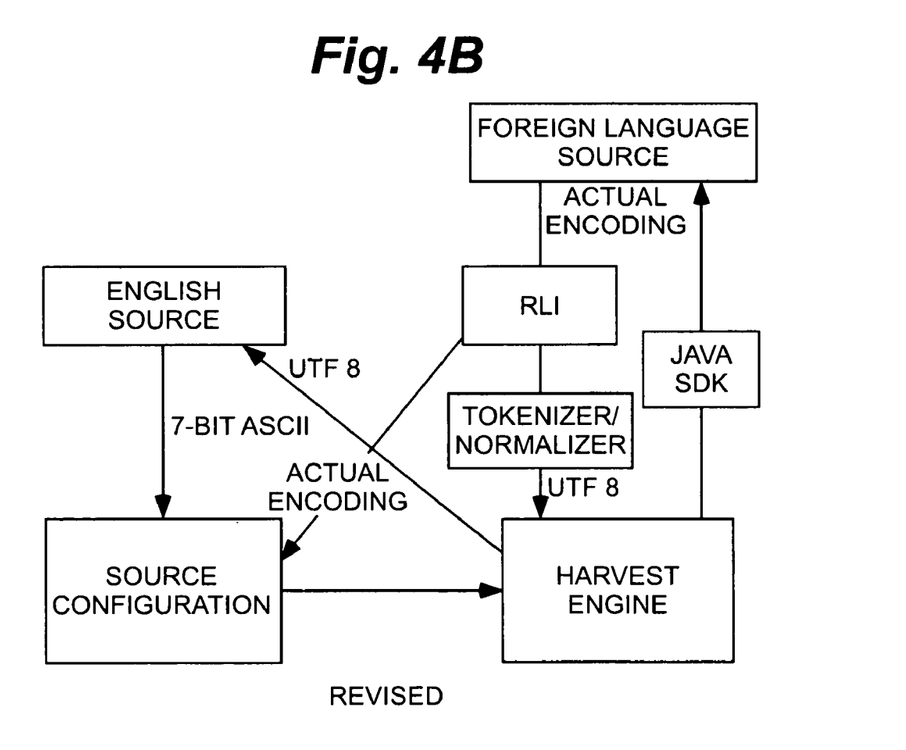
Figure 5A:
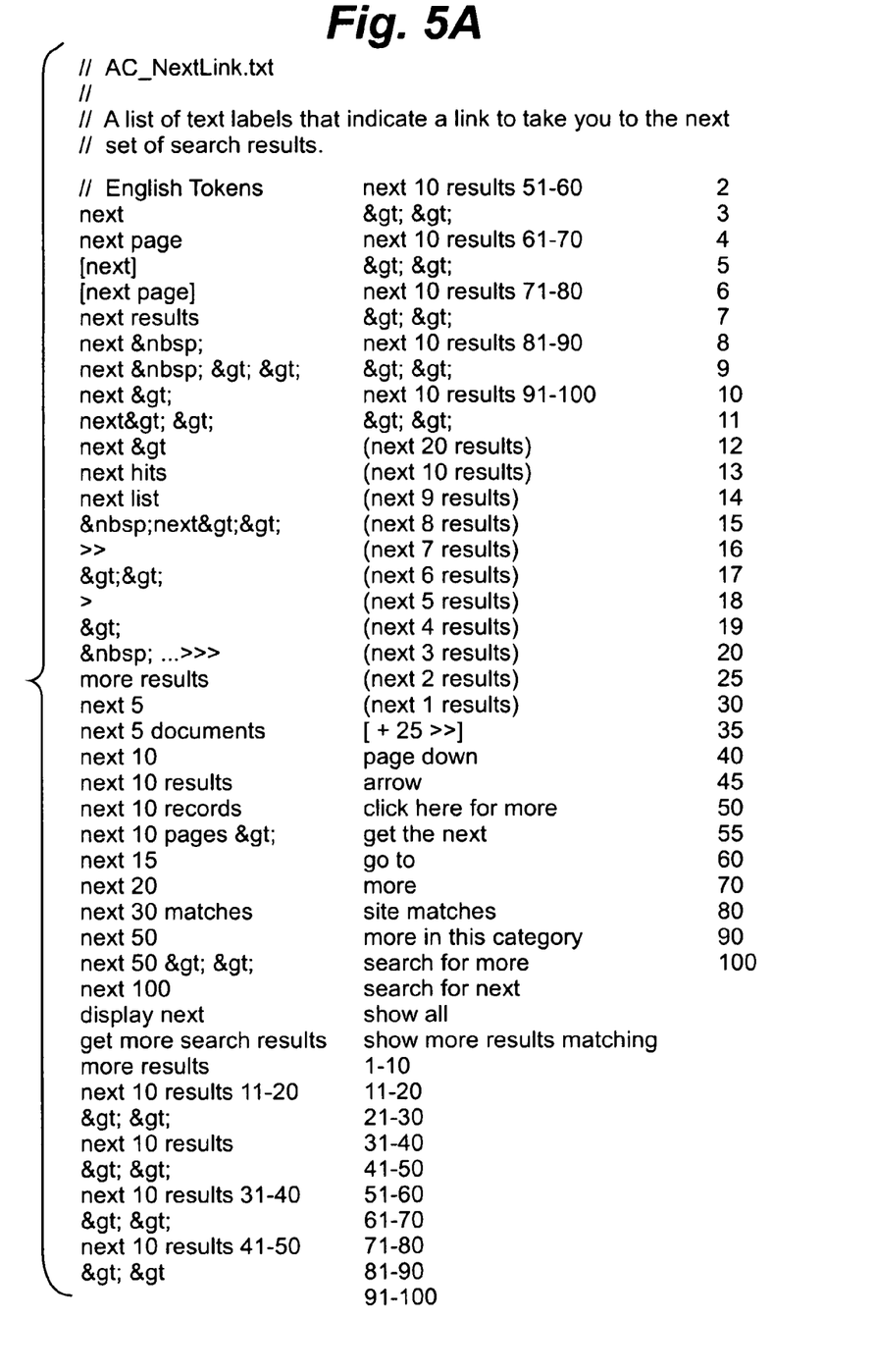
FIGS. 5A-5D provide listings of various 'next links' tokens and 'next results' handling according to aspects of the invention.
Figure 5B:
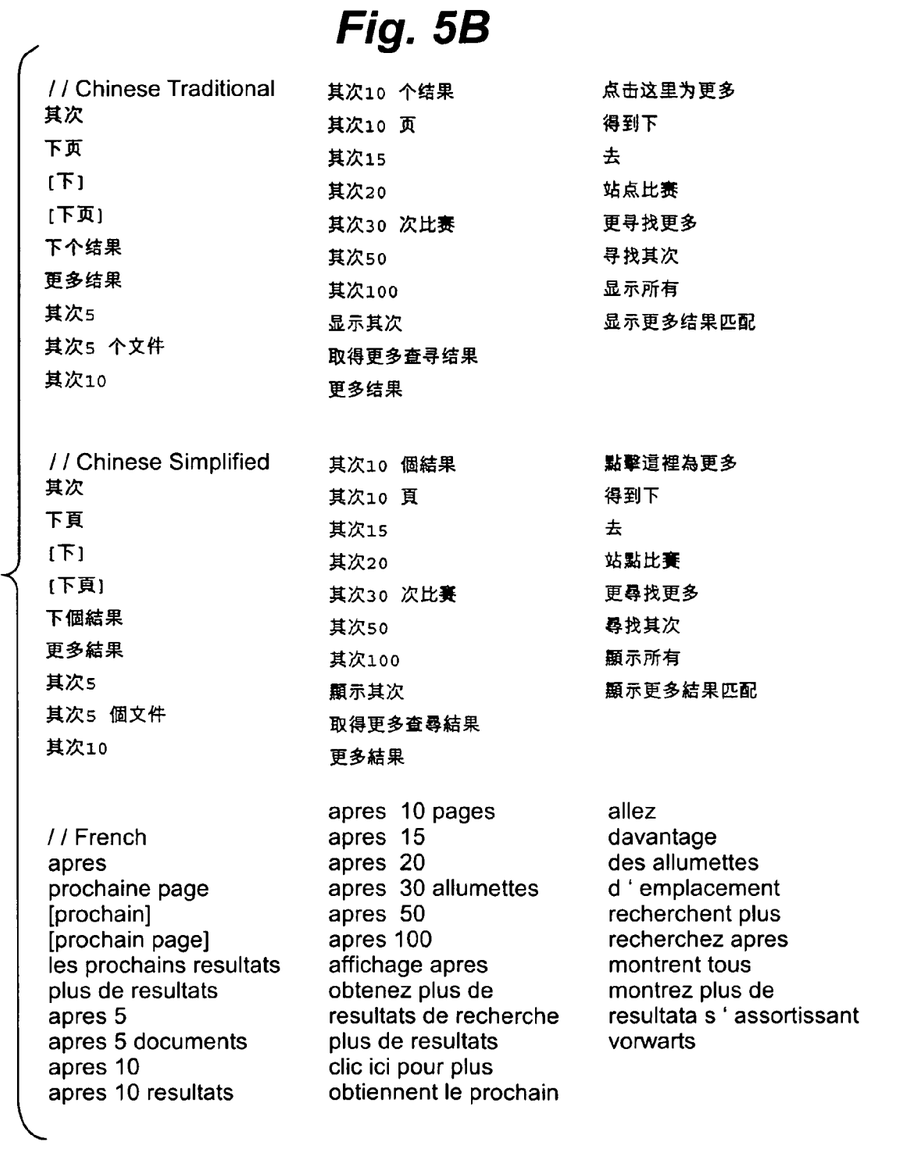
Figure 5C:
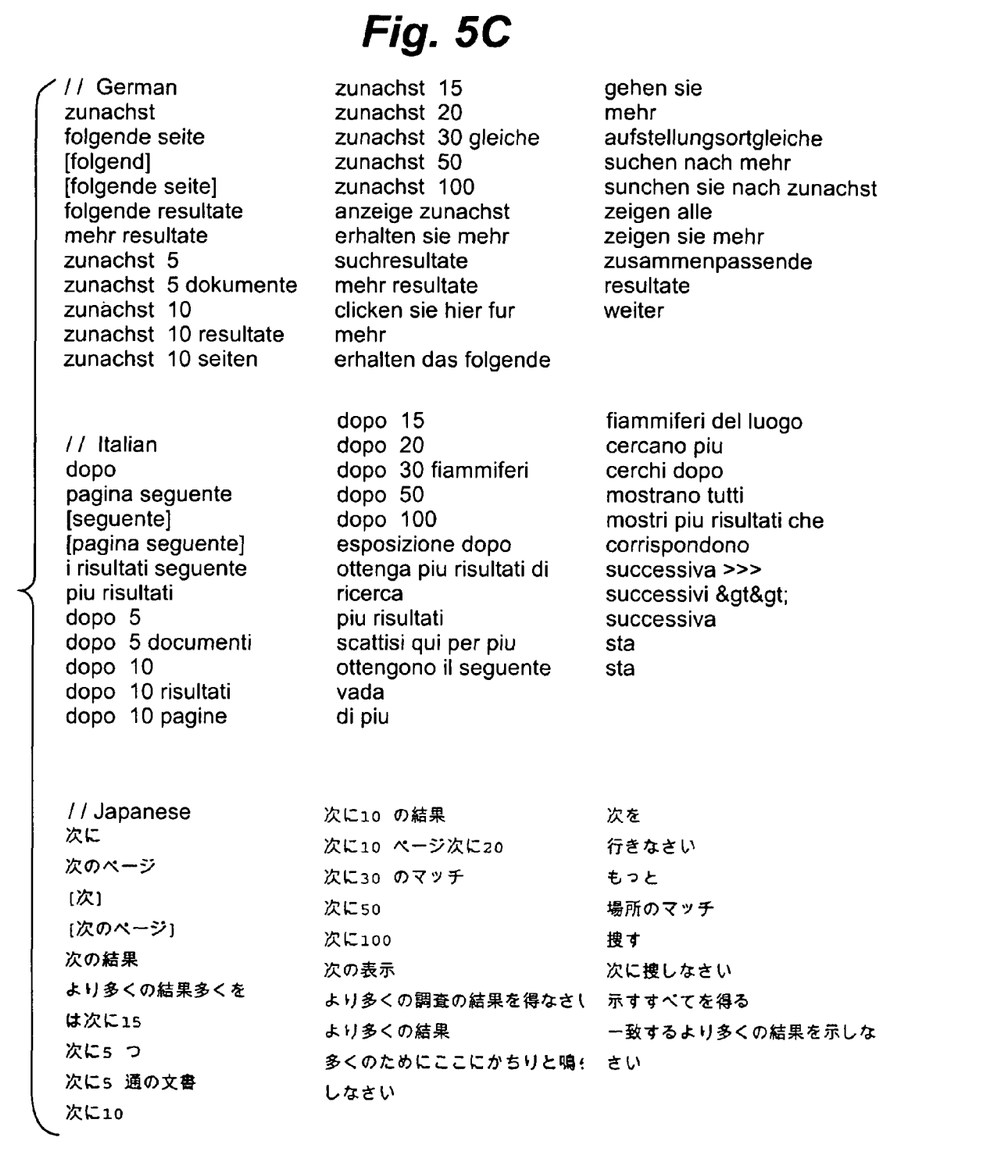
Figure 5D:
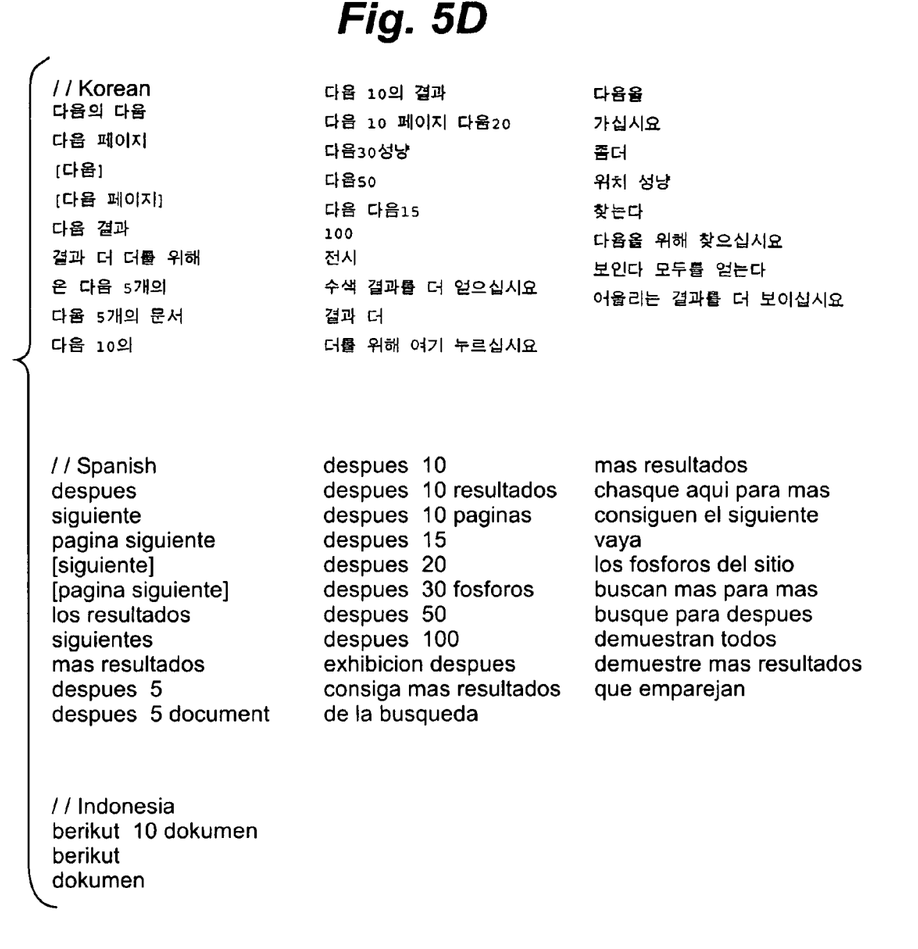

FIGS. 4A and 4B are diagrams illustrating a conventional approach and a "revised" approach according to one embodiment of the invention. Under the conventional approach of FIG. 4A, if the user indicated the harvest was in a foreign language, detection of the source site's encoding is done via BasisTech's RLI (Rosette Language Identifier), which does an excellent job for about 150 language/encoding pairs within 45 different legacy encoded formats and 55 different languages. Once identified, the system will convert the site's content into UTF-8. UTF-8 is used for all internal manipulation and storage however, at query time or during source configuration, requests are issued using the site's original character encodings, NOT UTF-8 or ISO-8859.

As noted, this approach works well when there is a prevalence of foreign language sites encoded with UTF-8, which is true for nearly all English sites and most European sites. However, in many language families, especially Asian sites, subsequent testing has shown UTF-8 use is uncommon, and legacy encodings are often used.

Under the "revised" approach of FIG. 4B according to one aspect of the invention, three additional processing steps are added, two of which are shown by new boxes. First, after RLI detection, the encoding type for the harvest source (and therefore the documents it contains) is recorded (this step is not shown on the diagram). Second, after RLI detection, a generalized "Tokenizer/Normalizer" is added. This step makes sure the document is properly tokenized into UTF-8 and, if it is not run against a specific language analyzer, it is "normalized" with respect to proper token handling (such as decompounding or white space detection) as a "generic" foreign language. Third, based on the recorded encoding type, communications back to the source are converted to the appropriate encoding form for that site, either legacy or UTF-8, using the Java SDK.

A majority of Chinese search engines chop a query into tokens, and then find documents that contain all tokens.)

令人大开眼界的东西 becomes these tokens 令人 大开 眼界 的 东西

So, no docs contain 令人大开眼界的东西 as one token, but many docs contain all of these tokens: 令人 大开 眼界 的 东西

Sending out the query chopped into tokens then assembled as a phrase will return few if any results.

Ex. 令人大开眼界的东西 is equivalent to 令人大开眼界的东西

Using English Boolean operators when sending queries to search engines, so the search engine is actually looking for the word "AND" on docs Ex. 令人大开眼界 is equivalent to 令人 大开眼界

One aspect of the invention involves prompting the user to form their query by ANDing tokens together. A properly tokenized query is used to search docs once tokenized by BasisTech RLP, but rules will be applied to create query that is to go out to a search engine. For example:

User Enters: 令人 AND 大开眼界
Query to Search Engine: 令人大开眼界
RULE: tokens separated by ANDs will be concatenated
User Enters: 令人 OR 大开眼界
Query to Search Engine: 令人 大开眼界
RULE: tokens separated by ORs will be separated by space
Ex. User Enters: " 令人大开眼界"
Query to Search Engine: " 令人大开眼界"
RULE: remove white space and add quotes for phrases This approach permits only minor modification to the source engine query composer on a language-by-language basis. This also allows for providing a single query syntax to users regardless of the language.

In another aspect of the invention, the user is prompted to enter a query akin to how they conventionally operate search engines. The system breaks the query into tokens using BasisTech RLP (Rosette Language Identifier), then AND those tokens together for an internal document search. The user-entered query is submitted to the search engine exactly as it was entered. For example:

User Enters: 令人大开眼界
Query to Search Engine: 令人大开眼界
Query to our Index: 令人 AND 大开眼界
User Enters: 令人大开眼界
Query to Search Engine: 令人大开眼界
Query to our Index: 令人 OR 大开眼界
User Enters: 令人大开眼界
Query to Search Engine: " 令人大开眼界"
Query to our Index: " 令人大开眼界"

One embodiment of proper query normalization is in the files entitled QueryNormalizer.java, QueryNormalizerChinese.java, QueryNormalizerJapanese.java, and QueryNormalizerStandard.java, which is incorporated by reference herein in its entirety.

Advanced Configuration Wizard

One aspect of the invention is directed to a system that operates in order to:

retrieve a copy of the source's HTML page
prompt that page to the user
ask the user to interact with the page to conduct a search
capture what the user does for future use.

Previously, the technique was to download the HTML page, scan the HTML for all form elements, and then modify the action strings to point back to query manager. This meant that much of the existing data had to be placed in hidden fields on the document then processed later.

According to one embodiment, a configuration wizard takes a different approach by not modifying the original HTML forms but instead using JavaScript to adjust the HTML's DOM (Document Object Model) tree to overwrite each form dynamically. This technique has demonstrated significant improvements to configuration success rates.

Using the JavaScript technique instead of modifying the HTML has the following advantages:

Allows the original page to fully load exactly as it was intended by the original author.
It avoids re-writing the HTML, which reduces complexity and avoids HTML issues.
HTML parsing is unnecessary, so poorly created HTML or heavy CSS (Cascading Style Sheets) pages pose no problems.
The JavaScript code runs within the user's browser, which better emulates how the original page was meant to work.
Works regardless of how the HTML form is submitted, button, image, link, hotkey, etc.
The code is smaller and runs more efficiently.
HTML frames do not cause issues The Computer Program Listing Appendix includes a program listing for one embodiment of the advanced configuration wizard in the file entitled sourceConfig.js, which is incorporated by reference herein in its entirety.

Summary Passage Selection

Summary creation has long be an expensive operation, typically taking many times greater than an actual search. Conventionally, summaries were created by the following approach:

1. Use query words to select a sequence containing one or more query keywords
2. Use description if present
3. Use document's beginning if no description is present
4. Construct summary buffer using 1 if possible, 2 if not According to one aspect of the invention, performance has been improved over the state of the art by modifying how the each passage is scored relative to the user's Boolean query and how the highest scoring passages are identified. An implementing pseudo-code algorithm according to one example embodiment is presented in FIGS. 3A-3E for illustration.

Previously, any phrase word would be highlighted in the summary window even if the instance was not part of a query phrase. In a related embodiment of the invention, only the query phrase instances get scored and displayed.

Passages are scored using query terms or query phrases using a geometric progression in a crescendo. Following non-query terms condense the score in a decrescendo with a regression symmetric to the progression. Once scored, passages are ranked and arranged in document appearance order before returning the results.

The Computer Program Listing Appendix includes a program listing for one embodiment of a summary passage selection implementation in the file entitled StemSumm.cpp, which is incorporated by reference herein in its entirety.

Quantification and Analysis of Harvest Issues

Three of the four batches of the international harvest sources showing configuration or results problems were specifically evaluated. Each evaluation involved physically inspecting the site, working with it via a standard browser, tracing its configuration through the BrightPlanet Deep Harvest Engine, and evaluating its own site code. These 97 sources had issues that can be classified in Table 2 as follows:

TABLE 2

| Issue | Number | Percentage All Sites | Valid Sites |
|---|---|---|---|
| Various Bugs | 33 | 34.0% | 37.5% |
| Now corrected | 33 | 34.0% | 37.5% |
| Fix ID'ed | 0 | 0.0% | 0.0% |
| Fix unknown, ??? | 0 | 0.0% | 0.0% |
| Encoding Issue | 17 | 17.5% | 19.3% |
| Now corrected | 0 | 0.0% | 0.0% |
| Fix ID'ed | 14 | 14.4% | 15.9% |
| Fix unknown, ??? | 3 | 3.1% | 3.4% |
| Javascript Issue | 20 | 20.6% | 22.7% |
| Other Issues | 18 | 18.6% | 20.5% |
| Now corrected | 5 | 5.2% | 5.7% |
| Fix ID'ed | 11 | 11.3% | 12.5% |
| Fix unknown, ??? | 2 | 2.1% | 2.3% |
| Not valid site | 9 | 9.3% | 10.2% |
| Subtotals | 97 | 100.0% | 100.0% |
| Now working | 38 | 39.2% | 43.2% |
| Fix ID'ed | 25 | 25.8% | 28.4% |
| Fix unknown, ??? | 25 | 25.8% | 28.4% |
| Not valid site | 9 | 9.3% | |
| TOTAL | 97 | 100.0% | |
| TOTAL VALID | 88 | | 100.0% |

The 97 sites had problems due to bugs, encoding treatment, Javascript or "other" issues. Each of these issues areas is discussed more fully in the next section. Note that 9 of the 97 sites were not valid; these sites either did not have a search box or only searched items such as postal codes not currently supported by the BrightPlanet Deep Harvest engine. Thus, the valid population to be assessed against these problem areas is 88. (Since a less detailed inspection of the fourth batch of sites showed the same issues, full evaluation of these sites was suspended to concentrate on resolving the actual issues.)

In some instances, this detailed investigation led to immediate code changes or bug fixes; some 38, or more than 40% of the sites were quickly corrected. Means to fix nearly another 30% of the sites also is evident. These problematic international sites suggest that more than 70% of observed problems will be corrected with ultimate international source success rates raised to exceed 90% overall.

Character Encoding

A major challenge in internationalization and foreign source support is "encoding." Because of the importance of this topic, general background information on foreign languages, their scripts, electronic encoding and encoding detection is provided below. This is a complicated area, and will become increasingly more so as more of the known 6,000 human languages globally become available on the Internet.

Encodings specify the arbitrary assignment of numbers to the symbols (characters or ideograms) of the world's written languages needed for electronic transfer and manipulation. One of the first encodings developed in the 1960s was ASCII (numerals, plus a-z; A-Z); others developed over time to deal with other unique characters and the many symbols of (particularly) the Asiatic languages.

Some languages have many character encodings and some encodings, for example Chinese and Japanese, have very complex systems for handling the large number of unique characters. Two different encodings can be incompatible by assigning the same number to two distinct symbols, or vice versa. The Unicode Consortium set out to establish a single character encoding standard for universal encoding that represents all written languages. Unicode is that standard. Within Unicode, there are a three encoding forms, the most common for use in data interchange being UTF-8.

BrightPlanet, along with many others, has adopted UTF-8 as the standard format to process all string data. There are tools available to convert nearly any existing character encoding into a UTF-8 encoded string. Java supplies these tools as does BasisTech. However, there is also an unfortunate high prevalence of "legacy" encodings in use on the Internet. The two primary problems when dealing with "legacy" non-Unicode encodings are; 1) identifying what the encoding is and converting that encoding to a Unicode string, usually UTF-8; and then 2) communicating back to that site in its original encoding.

In BrightPlanet's original approach, users needed to indicate whether a harvest site was in a foreign language, else the harvest was treated as standard English. In standard English, no language detection took place, and all tokenization (which creates an electronic encoded form) used a 7-bit ASCII parser. (Note that English requires few character symbols and these overlap with the same smaller sub-set in UTF-8.)

Under the original approach, if the user indicated the harvest was in a foreign language, detection of the source site's encoding was done via BasisTech's RLI (Rosette. Language Identifier), which does an excellent job for about 150 language/encoding pairs within 45 different legacy encoded formats and 55 different languages. Once identified, BrightPlanet then converted the site's information into the UTF-8 format using the Java SDK (software development kit). The UTF-8 form was then used for all internal DQM manipulation and storage. At query time or during source configuration, requests were also issued back to the site using UTF-8.

As noted, this approach works well when there is a prevalence of foreign language sites encoded with UTF-8 or a subset of UTF-8, which is true for nearly all English sites and most European sites. However, in many language families (see below), especially Asian sites, subsequent testing has shown this not to be the case, and legacy encodings are often used. Thus, to summarize, BrightPlanet's original design had three unique problems within the source configuration and harvester with regard to character encodings:

1. We only interacted using UTF-8 and many sites do not use UTF-8
2. Our source configuration tokenizer needed to be able to process documents using their original encodings. Originally, our tokenizer converted all documents to UTF-8 before processing them, and
3. Our advanced Wizard did not take legacy encodings into consideration and used UTF-8 for processing, often leading to configuration failures (and therefore the inability to harvest from that site).

Thus, under our "revised" approach shown above, three additional processing steps are being added, two of which are shown by new boxes. First, after RLI detection, the encoding type for the harvest source (and therefore the documents it contains) is recorded; this step is not shown on the diagram. Second, after RLI detection, a generalized "Tokenizer/Normalizer" is added. This step makes sure the document is properly tokenized into appropriate UTF-8 and, if it is not run against a specific language analyzer, it is "normalized" with respect to proper token handling (such as decompounding or white space detection) as a "generic" foreign language. And, third, based on the recorded encoding type, communications back to the source are converted to the appropriate encoding form for that site, either legacy or UTF-8, using the Java SDK.

'Next Links' Recognition

Currently, our next link recognition logic is mostly list driven which works well the majority of the time. There are additional rules that account for issues that are not solvable using lists but for the most part, this problem is solved well with lists. An exemplary list of 'next links' tokens by language are provided in FIGS. 5A-5D. These lists may be expanded by language to support various ways non-English languages may say "take me to the next set of results."

'Next Results' File

An important aspect of successful harvesting is obtaining 'next results' pages that expand the number of candidate documents beyond those listed on the first results page from a search site. DQM uses a number of clues or indicators to identify this field properly, all contained in a basic DQM configuration file.

This list has empirically grown for English and is now quite comprehensive for that language. Using the English list, as well as other specific language knowledge, results in this the 'next results' lookup file depicted in FIGS. 5A-5D.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An improved information automation system for deep web harvesting of data the information automation system including computer hardware and being configured to connect with individual ones of a plurality of separately-searchable deep web sources and, for each deep web source, to (a) automatically analyze a search query entry form and search result output format; (b) based on that analysis, automatically develop a source-specific query format and search result collection process corresponding to that deep web source; and (c) automatically store each source-specific query format as a source record associated with a corresponding deep web source; wherein for performing a new deep web harvest, the system is configured to accept input of new search criteria and, based on a plurality of source records, formulate a plurality of distinct queries based on a corresponding plurality of source records and on the new search criteria, the improvement comprising:

a user interface device configured to display a visual output and to accept user input including the input of the new search criteria, the user interface device being programmed to:

display, via the visual output, contents of a first automatically-configured source record in a user-readable form;

facilitate user editing of certain portions of the first source record via the interaction with user-readable form; and facilitate functionality testing, via user interaction with the user-readable form, of a sample automated interaction between the information automation system and the deep web source that corresponds to the first source record, with the automatic interaction being conducted based on the first source record being edited;

wherein the sample automated interaction is user-initiatable via the user-readable form; and wherein in response to an initiation of the sample automated interaction, at least a portion of a harvesting operation is automatically performed, and a sample result set of the sample automated interaction is displayed via the user interface device for review by the user.

2. The improved information automation system of claim 1, wherein the user-readable form includes a sample query entry portion that accepts sample search criteria entered by a user, and from which a first type of sample automated interaction is initiatable by the user, wherein the first type of automated transaction executes a first sample query at the first source based on the sample search criteria, and displays an output of initial results of the first sample query that are produced by the first source for review by the user.

3. The improved information automation system of claim 2, wherein the first type of sample automated interaction omits harvesting operations beyond obtaining initially-displayed results of the first sample query.

4. The improved information automation system of claim 2, wherein the output of initial results is displayed for review by the user in a separate window from the user-readable form, and wherein following execution of the first type of sample interaction, the user-readable form remains displayed on the user interface device for further editing by the user.

5. The improved information automation system of claim 2, wherein the user-readable form includes source test initiation portion from which a second type of sample automated interaction is initiatable by the user, wherein the second type of automated transaction executes a second sample query at the first source based user-specified search criteria, and displays an output of harvested results of the second sample query that are produced by the first source for review by the user, wherein the harvested results include initially-displayed search results provided by the first source and subsequently-displayed search results provided by the first source in response to additional automated interaction with the first source.

6. The improved information automation system of claim 1, wherein the functionality testing includes separate selectable testing of (i) specific query action functionality of the first source record that returns only initially-displayed search results in response to a sample query automatically executed at the first source; and (ii) source harvesting functionality of the first source record that returns initially-displayed search results provided by the first source in response to a sample query, and subsequently-displayed search results provided by the first source in response to the sample query and further in response to additional automated interaction with the first source.

7. The improved information automation system of claim 1, wherein the user interface is programmed to facilitate user editing of at least one field of the user-readable form that corresponds to at least one parameter of the first source record selected from the group consisting of: title, encoding, language, search results removal flag, action string, action method type, Boolean operator configuration, next link identification, filter link identification, source authentication, or any combination thereof.

8. The improved information automation system of claim 1, wherein the user interface is programmed to:

accept a deep web harvest query entry from a user, the deep web harvest query being applicable to a plurality of different sources and having an original set of Boolean operators; and facilitate user editing to set source-specific Boolean operators for the first source record; and wherein the information automation system is programmed to automatically-re-form the web harvest query directed at the first source such that the source-specific Boolean operators are used in that query in place of the original set of Boolean operators.

9. The improved information automation system of claim 1, wherein the user interface is programmed to accept a deep web harvest query entry from a user, the deep web harvest query being applicable to a plurality of different sources and having an original syntax that includes a set of original Boolean operators; and wherein the information automation stem is programmed to determine whether the first source utilizes a query syntax that differs from the original syntax and, in response to a determination that the first source utilizes a query syntax that omits Boolean operators, to automatically-re-form the web harvest query directed at the first source into a new syntax that differs from the original syntax such that the new syntax reflects logic of the original syntax based on the set of original Boolean operators but without the presence of any Boolean operators.

10. The improved information automation system of claim 9, wherein the information automation stem is programmed to determine whether the first source utilizes a query syntax that differs from the original syntax based on a language associated with the first source.

11. The improved information automation system of claim 9, wherein the information automation stem is programmed to re-form the web harvest query for the first source by removing the Boolean operators from the web harvest query, and by inserting or removing at least one space between search tokens based on the set of original Boolean operators.

12. The improved information automation system of claim 1, wherein the user interface is programmed to accept a deep web harvest query entry from a user, the deep web harvest query being applicable to a plurality of different sources and having an original syntax that includes a set of non-English language search tokens and a set of English language Boolean operators.

13. The improved information automation system of claim 1, further comprising:

a storage arrangement in which source records are stored, the storage arrangement being a data storage space that is a part of a search engine program stored on a computer-readable medium.

14. The improved information automation system of claim 1, wherein the user interface is programmed to facilitate automatic configuration of a source record based on automatic analysis of a user's interaction with a source to which that source record corresponds.

15. The improved information automation system of claim 14, wherein the user interface is programmed to obtain a copy of an HTML page of the source, and to monitor a user's interaction with that copy of the HTML page.

16. The improved information automation system of claim 15, wherein the user interface is programmed to dynamically adjust a document object model (DOM) tree of the HTML page without modifying any original forms of the HTML page.

17. The improved information automation system of claim 15, wherein in response to the user's interaction with the copy of the HTML page, the information automation system determines which data entry fields of the HTML page should be set in accordance with execution of a query, and which action button should be activated to initiate that query.

18. The improved information automation system of claim 1, wherein the user interface is programmed to accept a deep web harvest query entry from a user, the deep web harvest query being applicable to a plurality of different sources and having an original syntax that includes a set of original Boolean operators; and wherein the information automation stem is programmed to determine a type of character encoding used by the first source, and to re-form the deep web harvest query for the first source to correspond with the type of character encoding determined to be used by the first source.

19. In a computer-implemented information automation system for deep web harvesting of data in which the information automation system includes computer hardware and is configured to connect with individual ones of a plurality of separately-searchable deep web sources and, for each deep web source, to (a) automatically analyze a search query entry form and search result output format; (b) based on that analysis, automatically develop a source-specific query format and search result collection process corresponding to that deep web source; and (c) automatically store each source-specific query format as a source record associated with a corresponding deep web source; wherein for performing a new deep web harvest, the system is configured to accept input of new search criteria and, based on a plurality of source records, formulate a plurality of distinct queries based on a corresponding plurality of source records and on the new search criteria, a method for interactively editing source records, the method comprising:

displaying, via a user interface device, contents of a first automatically-configured source record, the contents being displayed in a user-readable form;

providing, via the user-readable form, editable fields for modifying content of the first source record;

providing, via the user-readable form, a functionality testing initiation control, such that, when activated, the functionality testing initiation control initiates a sample automated interaction between the information automation system and the deep web source that corresponds to the first source record, with the automatic interaction being conducted based on the first source record being edited;

in response to an initiation of the sample automated interaction, automatically performing at least a portion of a harvesting operation, and displaying, via the user interface device, a sample result set of the sample automated interaction.

20. The method of claim 19, further comprising:
obtaining a copy of an HTML page of a source to which a source record corresponds, and displaying the copy of the HTML page via the user interface device;
automatically monitoring a user's interaction with the copy of the HTML page;
automatically analyzing the monitored interaction with the copy of the HTML page to determine which fields in the HTML page are relevant to querying the source and browsing query results provided by the source; and
automatically configuring the source record based on the fields in the HTML page that are determined to be relevant to querying the source and browsing the query results.

* * * * *